(12) United States Patent
Ouedraogo et al.

(10) Patent No.: US 8,418,038 B2
(45) Date of Patent: Apr. 9, 2013

(54) ERROR CORRECTING METHOD AND DEVICE

(75) Inventors: Naël Ouedraogo, Acigne (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 12/767,295

(22) Filed: Apr. 26, 2010

(65) Prior Publication Data
US 2010/0275105 A1    Oct. 28, 2010

(30) Foreign Application Priority Data
Apr. 28, 2009   (FR) .................................. 09 52794

(51) Int. Cl.
- H03M 13/00    (2006.01)
- H04B 1/66    (2006.01)
- H04N 7/12    (2006.01)

(52) U.S. Cl. .................................. 714/776; 375/240.27
(58) Field of Classification Search .................. None
See application file for complete search history.

(56) References Cited

U.S. PATENT DOCUMENTS

| | | |
|---|---|---|
| 7,716,302 B2 | 5/2010 | Maze |
| 7,734,751 B2 | 6/2010 | Donescu |
| 2005/0044146 A1 | 2/2005 | Nassor |
| 2005/0228753 A1 | 10/2005 | Viger |
| 2005/0278389 A1 | 12/2005 | Maze |
| 2006/0271688 A1 | 11/2006 | Viger |
| 2007/0189286 A1 | 8/2007 | Park |
| 2007/0211799 A1 | 9/2007 | Henocq |
| 2008/0084821 A1 | 4/2008 | Maze |
| 2008/0294789 A1 | 11/2008 | Nassor |
| 2009/0097483 A1 | 4/2009 | Henocq |
| 2010/0040077 A1 | 2/2010 | Maze |
| 2010/0061251 A1 | 3/2010 | Nassor |

FOREIGN PATENT DOCUMENTS

| | | |
|---|---|---|
| EP | 2 009 922 | 12/2008 |
| WO | 2006/122313 | 11/2006 |

OTHER PUBLICATIONS

Ghandi, M., et al., "Error concealment for SNR scalable video coding", Signal Processing: Image Communication 21 (2206) 91-99, Feb. 1, 2006.

Tao, S., et al., "Real-Time Monitoring of Video Quality in IP Networks", IEEE/ACM Transactions on Networking, vol. 16, No. 5, Oct. 1, 2008.

Yamada, T., et al., "No-Reference Video Quality Estimation Based on Error-Concealment Effectiveness", NEC Corporation, Common Platforms Software Research Laboratories, Kawasaki, Japan, Nov. 1, 2007.

French Preliminary Search Report dated Jan. 7, 2010 issued during prosecution of related French application No. 0952794.

*Primary Examiner* — Guerrier Merant
(74) *Attorney, Agent, or Firm* — Fitzpatrick, Cella, Harper & Scinto

(57) ABSTRACT

The invention concerns a method of correcting errors in a data stream of at least one image, implemented in a data reception device, said at least one image being cut up into image portions, said stream being coded by image portion and divided into data packets, the method comprising a step of detecting at least one lost data packet and being characterized in that it comprises the following steps:
- determining a strategy for cutting up said at least one image into image portions,
- determining, according to the determined cutting-up strategy, an item of information representing the reconstruction quality of data included in said at least one lost packet by an error correcting method,
- adapting said error correcting method according to the determined item of information representing the reconstruction quality, and
- applying the adapted error correcting method to the adapting step to reconstruct the data included in said at least one lost packet.

17 Claims, 12 Drawing Sheets

ERROR CORRECTING METHOD AND DEVICE

FIELD OF THE INVENTION

The present invention concerns a method and a device for correcting errors.

More particularly, it concerns a method of correcting errors in a coded multimedia data stream implemented in a data reception device.

In a complementary manner, it concerns a device adapted to implement the method in accordance with the invention.

BACKGROUND OF THE INVENTION

When a data stream, for example a sequence of images or video, is sent over a communication network, certain items of data of the data stream are liable to be lost or corrupted.

In the case of a packet-switched communication network, the data stream is cut up into data packets or network packets. On transmitting the data stream so cut up, data packets may get lost.

A consequence of the loss or the corruption of a data packet which occurs on sending a video sequence is the appearance of artifacts (artificial disturbance) in certain images of the video sequence. These artifacts reduce the quality of the video sequence.

In order to improve the quality of the images, error resilience techniques are applied to the images in the sequence of images.

For example, these methods of error resilience consist of error concealment algorithms or of retransmission algorithms.

Each image of a sequence of images is divided into elementary units termed macroblocks. Furthermore, each image is cut up into slices before being coded. Each slice is composed of one or more elementary units termed macroblocks.

Moreover, the servers may employ different strategies for cutting up the image into image portions. For example, strategies consisting in using a fixed number of macroblocks per slice or a fixed number of bytes per slice may be employed.

Depending on the type of network and on the network protocol used to transport the data, the data of the data stream corresponding to a slice may either be inserted into a network packet or be cut up into groups of data (termed "fragmented units"). In particular, if the size of the data corresponding to a slice (in number of bits) is greater than the maximum size permitted for a network packet, the slice is cut up into groups of data. Each group of data or fragmented unit is inserted into a network packet. Furthermore, when the size of the data corresponding to the slices (in number of bits) is considerably less than the maximum size permitted for a network packet, it is possible that data corresponding to several slices may be inserted into the same data packet or network packet.

When the data corresponding to the same slice are divided into fragmented units, that is to say that the data of the same slice are inserted into different data packets, the effect on the decoding of the loss of each data packet corresponding to the same slice is different. For example, the effect of the loss of a data packet containing a fragmented unit corresponding to the start of a slice is not identical to the effect of the loss of a data packet containing the fragmented unit corresponding to the end of the slice. As a matter of fact, if the fragmented unit corresponding to the start of the slice is lost, the slice cannot be decoded, even if the other fragmented units of a slice have not been lost.

Consequently, the loss of a packet means that the number of items of data to correct is higher or lower depending on the coding used.

Document US 2007/0189286 describes a method enabling a codestream to be reconstructed that is compatible with the decoding. In particular, this method makes it possible to detect, at the depacketizer, whether a received data packet that follows a lost packet corresponds to a slice start, and thus to send such a packet to the decoder.

Nevertheless, this method does not act on the error correction and does not make it possible to improve the quality of reconstruction by error correction when multiple losses of data packets occur in the case of sending by fragmented units.

SUMMARY OF THE INVENTION

An object of the present invention is to overcome at least one of the aforesaid drawbacks and to provide a method of correcting errors enabling a method of correcting errors to be optimized.

To that end, according to a first aspect, the present invention is directed to a method of correcting errors in a data stream of at least one image, implemented in a data reception device, said at least one image being cut up into image portions, said stream being coded by image portion and divided into data packets, the method comprising a step of detecting at least one lost data packet.

According to the invention, the error correcting method comprises the following steps:
  determining a strategy for cutting up said at least one image into image portions,
  determining, according to the determined cutting-up strategy, an item of information representing the reconstruction quality of data included in said at least one lost packet by an error correcting method,
  adapting said error correcting method according to the determined item of information representing the reconstruction quality, and
  applying said adapted error correcting method to the adapting step to reconstruct the data included in said at least one lost packet.

Thus, the error correcting method is optimized according to the strategy used for cutting up the image into image portions on coding the data stream. The method according to the invention thus takes into account not only the loss of a data packet, but also effects of the loss of that data packet. As a matter of fact, the consequence of the loss on the reconstruction quality of the lost data is different according to the type of cutting up used for the image. The correcting method is thus more effective, in particular in the case where several network packets corresponding to fragments of coded image portions are lost.

According to a feature, the item of information representing the reconstruction quality of lost data is also determined according to the quantity of decodable coded data received by said reception device.

To be precise, the quantity of decodable coded data depends on the type of cutting up of said at least one image into image portions that is used on coding the data stream. Thus, the quantity of decodable coded data has a direct impact on the reconstruction quality of lost data and thus on the item of information representing that quality.

Consequently, the fact of taking into account the type of cutting up of the image into image portions on implementing the error correcting method increases the effectiveness of the error correcting method.

For example, the step of determining the strategy for cutting up each image into image portions comprises a sub-step consisting of determining the number of image sub-portions in an image portion and the number of bytes contained in said image portion.

In an embodiment, the cutting up strategy uses a fixed number of sub-portions per image portion.

According to a variant, the cutting up strategy uses a fixed number of bytes per image portion.

In an embodiment, the step of determining an item of information representing the reconstruction quality of lost data comprises the following sub-steps, which are implemented for each image portion belonging to an image:
  evaluating the area of said image portion,
  evaluating the quantity of decodable data in said image portion, and
  evaluating the area to reconstruct of said image portion according to said evaluated area of said image portion and said evaluated quantity of decodable data.

Thus, the item of information representing the reconstruction quality of lost data depends on the image area to reconstruct by said error correcting method. The image area to reconstruct for each image portion is estimated according to the area of said image portion and the quantity of decodable data of said image portion.

According to a feature, the step of adapting the error correcting method comprises a prior step of comparing the determined item of information representing the reconstruction quality with a threshold representing a quality limit.

Advantageously, the threshold representing a quality limit represents an image area limit.

Consequently, a comparison is carried out between the determined item of information representing the reconstruction quality for the error correcting method and a threshold representing the area limit that is acceptable for the error correcting method to be effective.

For example, when the item of information representing the quality is less than the threshold, said item of information representing the quality depending on the area to reconstruct by the error correcting method, the error correcting method is applied to the whole image portion.

Thus, the area to reconstruct being small, the error correcting method is effective when it is applied to the whole area of the image portion.

On the contrary, when the item of information representing the quality is greater than the threshold, said item of information representing the quality depending on the area to reconstruct by the error correcting method, the error correcting method is applied to a part of the image portion.

Consequently, the error correcting method is adapted according to the size of the area to reconstruct and the reconstruction of the image thanks to this method is thus of good quality.

In another embodiment, the item of information representing the reconstruction quality of lost data depends on an importance criterion for the decoding associated with each lost data packet.

According to a feature, the importance criterion of a data packet depends on the quantity of decodable data of said image portion when the lost data packet is correctly received by the reception device.

Thus, each data packet has an importance for the decoding according to the reconstructible data of the image portion when that data packet is considered as correctly received by the reception device.

When the importance of the packet is high, the number of reconstructible items of data is high and when the importance of the packet is low, the number of reconstructible items of data is low.

According to another feature, a processing priority level is associated with each lost data packet according to the respective importance of said lost data packets.

Advantageously, said error correcting method comprises a request for re-sending the lost data packets according to the priority levels associated with the lost data packets.

Thus, if all the retransmission requests made by the reception device cannot be satisfied by the server, the lost packets enabling a higher quantity of data to be decoded will receive priority for retransmission.

Consequently, the effectiveness of the error correcting method is increased.

According to a second aspect, the present invention concerns a device for correcting errors in a data stream of at least one image, said at least one image being cut up into image portions, said stream being coded by image portion and cut up into data packets, said device comprising means for receiving data and means for detecting at least one lost data packet.

According to the invention, the device comprises:
  means for determining a strategy for cutting up said at least one image into image portions,
  means for determining, according to the determined cutting-up strategy, an item of information representing the reconstruction quality of data included in said at least one lost packet by an error correcting method,
  means for adapting said error correcting method according to the determined item of information representing the reconstruction quality, and
  means for applying said error correcting method adapted by the adapting means to reconstruct the data included in said at least one lost packet.

According to a feature, the means for determining the cutting-up strategy comprise means for determining an item of information representing the coding strategy item of information.

According to another feature, the means for determining the cutting-up strategy comprise means adapted to determine the number of sub-portions and the number of bytes contained in said image portion.

In an embodiment, the means for determining an item of information representing the reconstruction quality of lost data comprise:
  means for evaluating the area of said image portion,
  means for evaluating the quantity of decodable data in said image portion, and
  means for evaluating the area to reconstruct of said image portion, according to said evaluated area of said image portion and said evaluated quantity of decodable data.

According to a third aspect, the present invention concerns a storage means for storing information which can be read by a computer or a microprocessor holding instructions of a computer program, adapted to implement the method as succinctly described above, when the stored information is read by the computer or the microprocessor.

In a particular embodiment, this storage means is partially or totally removable.

According to a fourth aspect, the present invention concerns a computer program product able to be loaded into a programmable apparatus, comprising sequences of instructions for implementing the method as succinctly described above, when that computer program product is loaded into and executed by the programmable apparatus.

As advantages of the device, as well as the particular features and advantages of the information storage means and of the computer program product are similar to those of the error correcting method, they are not repeated here.

BRIEF DESCRIPTION OF THE DRAWINGS

Still other particularities and advantages of the invention will appear in the following description.

In the accompanying drawings, given by way of non-limiting example:

FIG. 7 is a flowchart representing an embodiment of step S81 of FIG. 6a;

FIG. 8 is a flowchart representing a detailed embodiment of step S82 of FIG. 6a;

DETAILED DESCRIPTION OF PARTICULAR EMBODIMENTS

Figure 1:
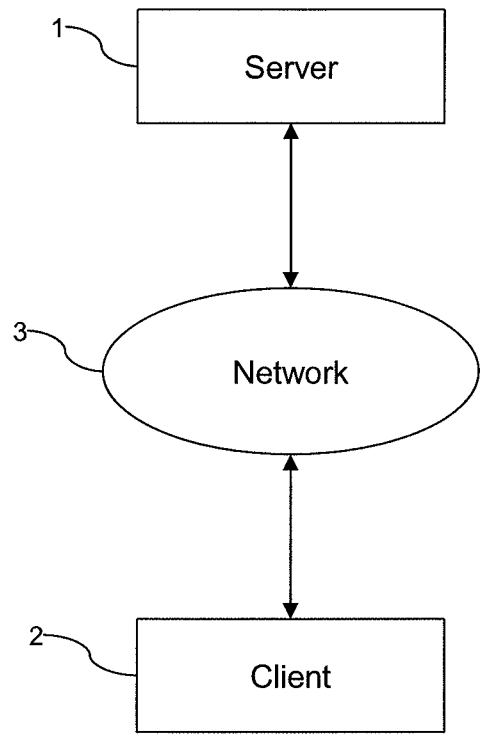
FIG. 1 is a diagram of the application context of the present invention.
Figure 1:
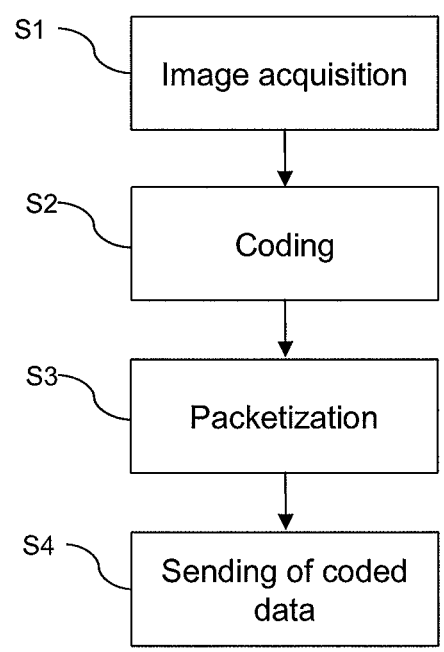

With reference to FIG. 1, a description will first of all be given of the context in which the invention is situated.

FIG. 1 represents a server device 1, a client device 2 and a communication network 3. The server 1 represents a data sending device, the client 2 represents a reception device and the network 3 represents a system for transmitting a data stream between the server 1 and the client 2.

The data transmitted by the server 1 to the client 2 over the network 3 are for example video data.

Of course, the data may be multimedia data, that is to say video and/or audio.

In this context, a functionality of the server 1 consists in implementing an acquiring step S1 in order to capture data, for example data corresponding to an image or to a sequence of images or video sequence. Next, each acquired image is coded at a coding step S2, placed in packets at step S3 and transmitted to the client at a transmitting step S4.

For example, the standard used for the coding is an MPEG standard, for example MPEG-1, MPEG-2 or MPEG-4.

In the embodiment described above, coding is used based on the prediction of the motion between different images of a sequence of images.

Prior to implementing the transmission of the data at step S4, the data are encapsulated into network packets according to a given protocol, for example the RTP protocol ("Real-time Transport Protocol"). This data encapsulating step is designated by the term "packetizing" the data.

The steps of coding S2, packetizing S3 and transmitting S4 will be described in more detail with the help of FIG. 2.

It will be noted that on transmitting the data over the network 3, network packets may be lost or altered. For example, in case of congestion of the network, nodes of the network are caused to delete or reject certain network packets.

After reception of the network packets, the client 2 extracts the data contained in the packets and identifies the missing or erroneous data. Next, the client 2 implements the decoding of the valid data and reconstructs the missing and/or erroneous image data using an error correcting method based on error correction algorithm.

Figure 2:
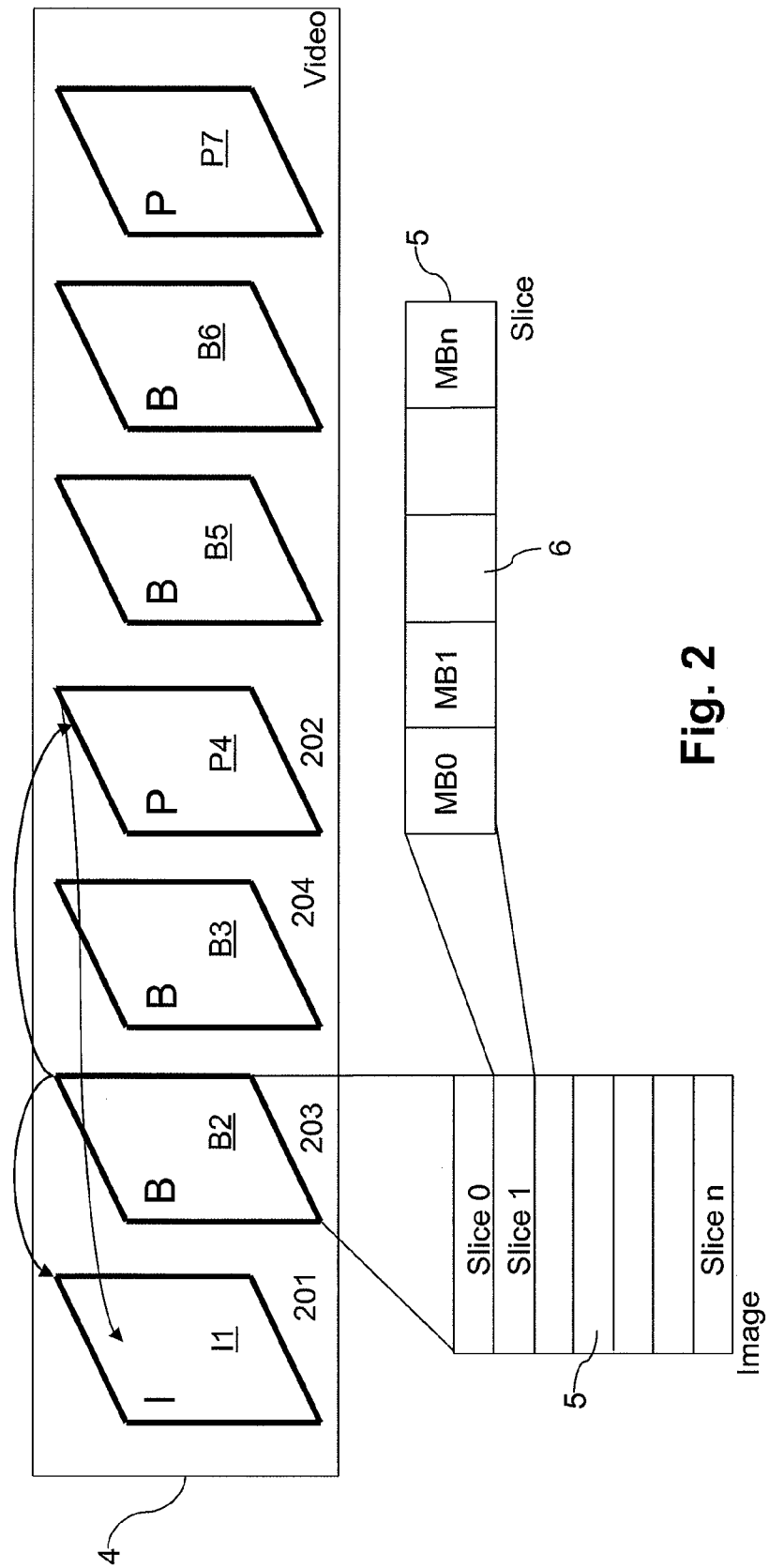
FIG. 2 is a diagram of the coding of a sequence of images.

With reference to FIG. 2, a description will now be given of the steps of coding S2, packetizing S3 and transmitting S4.

FIG. 2 represents a video sequence 4 (data stream) comprising a series of images I1, B2, B3, P4, B5, B6, P7.

The video sequence 4 is coded by means of a coder based on motion prediction, for example according to the standard H.264 (MPEG-4 part 10) or MPEG-4 Part 2.

In these standards, the coding may be of INTRA or INTER type.

INTRA or I coding is carried out without using any reference image, that is to say that an image coded using INTRA coding does not depend on other images.

As for P type INTER coding, this is carried out on the basis of a reference image by compensating for the motion between the reference image (coded in advance) and the image to code. The motion between the two images is evaluated by blocks, this evaluation serving to deduce a set of motion vectors (one motion vector per block) representing the translational movement between the blocks of the image to code and the corresponding blocks of the reference image. An image is predicted on the basis of this set of motion vectors. The difference between this predicted image and the image to code is calculated and coded with the set of motion vectors. It will be noted that this type of coding significantly reduces the quantity of data to code.

B type INTER coding is similar to the type P INTER coding but is carried out on the basis of two reference images.

In FIG. 2, image I1 is an INTRA image, images B2, B3, B5 and B6 are B type INTER images, and images P4 and P7 are P type INTER images. For example; image B2 is coded by taking images I1 and P4 as reference. For the coding of image P4, image I1 is taken as reference image.

Each image of the video sequence 4 is cut up into image portions or slices 5 and each slice 5 is composed of elementary coding units called macroblocks 6. Typically, the MPEG-4 coding standard defines square macroblocks of 16×16 pixels. These elementary units constitute sub-portions within the meaning of the invention. For the coding standards considered, there are in particular two strategies for cutting up an image of the sequence of images into image portions or slices: either each slice comprises a predetermined number of macroblocks, or each slice comprises a predetermined number of bytes. In the case of the second cutting up strategy, the number of macroblocks included in a slice is variable from one slice to another depending on the characteristics of the image signal to code.

It will be noted that in the case of the second cutting up strategy, the predetermined number of bytes may vary with a margin of variation, since one slice must contain a whole number of macroblocks.

According to certain standards, each macroblock 6 may be cut up into several sub-macroblocks.

It will be noted that a B type INTER image may comprise macroblocks of types I, P or B; a P type INTER image may comprise macroblocks of types I and P, and an INTRA image may solely comprise macroblocks of I type.

As stated above, once the images have been cut up into image portions, they are coded, then they are put into packets. There are several packetization techniques also called strategies for dividing the codestream into data packets or network packets. The portions of coded data are more particularly distributed into packets either as they are or by portion fragment. Thus, a network packet may comprise several slices (portions) of the same image or of several images, a single slice or a slice fragment.

According to a first strategy for packetation or division of the data into network packets, each network packet contains all the data corresponding to a single slice (which packetization technique or division strategy is known by the term "single NALU (Network Abstraction Layer Unit)")

When this strategy is used and a network packet is lost, is may be that it will not be possible to reconstruct the corresponding slice.

According to a second division strategy, a network packet contains several image slices. In this division strategy, a distinction is made between two types of network packets.

A first type of network packet contains several slices corresponding to the same time unit. For example, this first type of packet contains several slices of the same image. This first type of network packet is known as a STAP type packet (STAP standing for "Single-Time Aggregation Packet").

A second type of network packet contains several slices corresponding to different time units. For example, this second type of packet contains several slices of different images. This second type of network packet is known as an MTAP type packet (MTAP standing for "Multi-Time Aggregation Packet").

According to a third division strategy, a network packet contains a slice fraction known by the term fragmented unit. When a slice is divided into several fragmented units, each fragmented unit contains an indicator indicating whether it is the first or the last fragmented unit of a slice. When a fragmented unit is lost, the fragmented units which follow it cannot be decoded. According to a usual method of depacketization, the client rejects the whole slice when it has lost a fragmented unit.

"Depacketization" is understood to mean the reverse operation to "packetization". Thus, depacketization consists in extracting the useful data or payload from the network packets.

Consequently, a result of the loss of a network packet at the time of its transmission is the loss of at least one slice part.

An alternative method consists in marking the image portion containing the fragmented unit as incomplete and of performing the decoding of the data in that image portion. In this eventuality, the decoding of the data is complex since it is necessary to detect a syntax error most often at the time of the entropy decoding of the data. This method has the drawback of being difficult to make robust in the sense that the syntax of the incomplete data may still be correct despite the missing information. Furthermore, the detection of the error is sometimes not perfect and may produce artifacts in the image. This method is thus generally costly in calculating time, and the quality obtained is not necessarily satisfactory.

Figure 3:
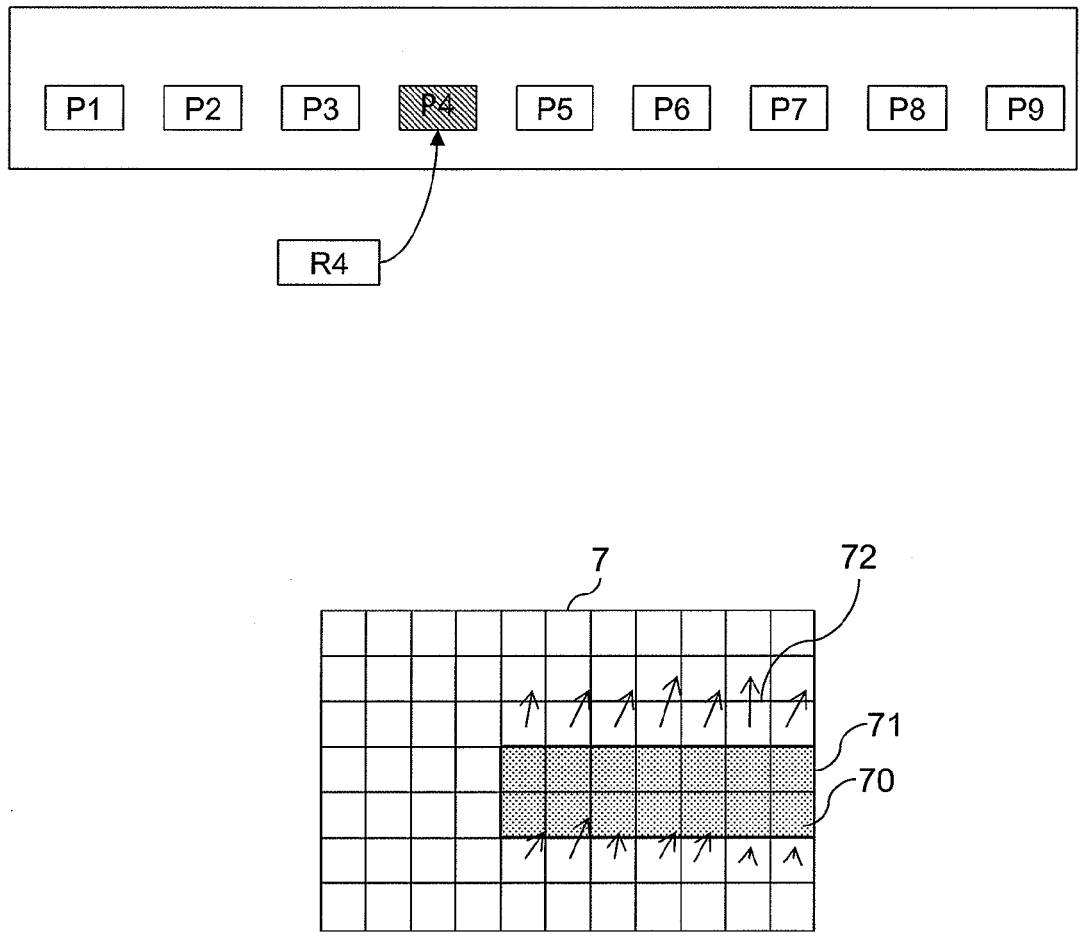
FIG. 3 is a diagram of two error correcting methods.

With reference to FIG. 3 a description will now be given of two error correction methods capable of being used in the invention.

A first correction method is based on an error concealment algorithm of temporal error concealment type. This type of algorithm enables correction of the erroneous pixels of a current image 7 of a video sequence 4 such as that of FIG. 2. The algorithm uses information from previous images in order to determine the pixels missing from a region 71 of missing pixels of the current image 7. This algorithm consists in estimating the motion vectors of the macroblocks of the erroneous region 71. The motion vector 72 of each macroblock 70 of the erroneous region 71 is determined by taking an average of the motion vectors 72 corresponding to the macroblocks neighboring the erroneous region 71. This algorithm is known to the person skilled in the art and will not be described here in more detail.

The quality of reconstruction of the missing data by this concealment algorithm depends on the quantity of missing data to be reconstructed. To be precise, when the size of the image area to be reconstructed is high, the quality of the concealment algorithm is mediocre. On the contrary, when the size of the image area to be reconstructed is low, the quality of the concealment algorithm is good.

A second error correction method is based on an algorithm whereby the client 2 identifies the missing or erroneous network packets P4 and requests retransmission of those network packets from the server 1.

The server 1 replies to this request from the client 2 by re-transmitting a re-transmission packet R4 enabling the lost network packet to be obtained.

Nevertheless, the server 1 does not automatically re-transmit the requested network packets, for example when the throughput of the network is not sufficient to send all the requested network packets.

Consequently, the reconstruction quality obtained by this type of algorithm depends on the quantity of decodable data after re-transmission of packets by the server 1.

Figure 4:
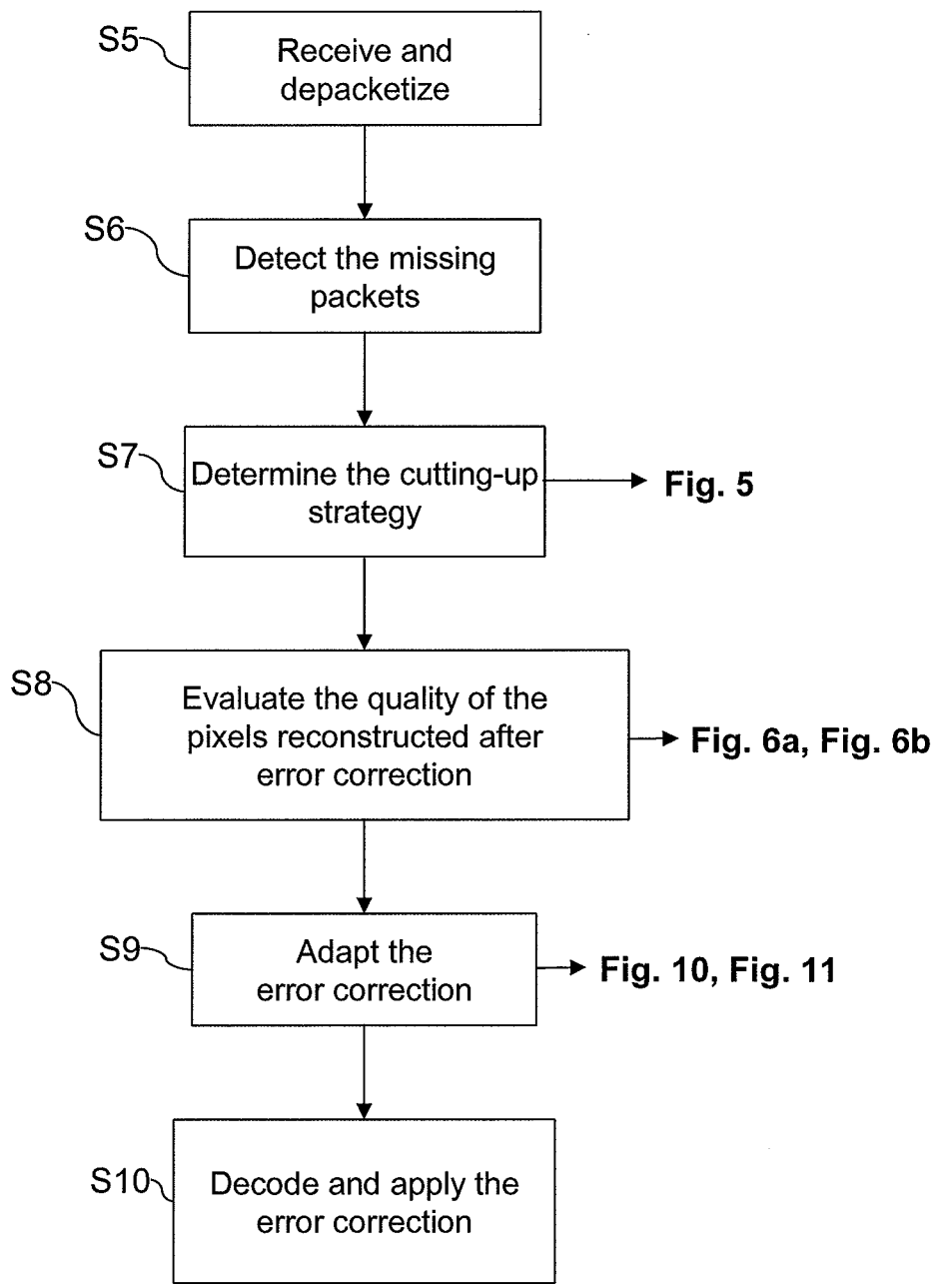
FIG. 4 is a flowchart representing an embodiment of a method in accordance with the invention implemented by a client.

With reference to FIG. 4 a description will now be given of an embodiment of a method in accordance with the invention and which is implemented by a client 2.

This method is based on the algorithm represented in FIG. 4. This algorithm comprises steps corresponding to instructions of a computer program of which the execution by a microprocessor or computer enables the implementation of the method.

The client 2 receives the network packets corresponding to an image 7 and performs the depacketization, that is to say the extraction of the useful data or payload of the network packets. This operation is implemented at a reception and depacketization step S5.

Next, the client 2 implements a step S6 for detecting missing or lost data packets. This step consists, for example, of putting the received packets in order on the basis of their sequence number and of comparing the packets pairwise.

The client implements a step S7 consisting of determining the strategy which was used by the server 1 for cutting up the images into image portions or slices. This step will be described in more detail with reference to FIG. 5.

Once the cutting up strategy has been determined, the client performs a step S8 of determining an item of information representing the reconstruction quality of lost data by an error correcting method based on an error correcting method.

Next, a step S9 for adapting the correction algorithm is performed. The adaptation of the correction algorithm is made on the basis of the item of information representing the reconstruction quality that was determined previously. This step will be described in more detail with reference to FIGS. 10 and 11.

Lastly, the client 2 carries out a decoding step S10 consisting in decoding the valid data and of implementing the error correction algorithm in order to obtain the image 7.

As promised earlier, a description will now be given with reference to FIG. 5 of a part of the method corresponding to the step S7 for determining the strategy for cutting up the image 7 into image portions. This strategy corresponds to the coding strategy employed at the coder.

In this example, a first strategy used on coding consists in cutting up an image 7 into image portions or slices 5 such that the number of macroblocks per slice is the same for all the slices. The slices are then coded independently from each other. A second strategy consists of determining the image data corresponding to a slice such that the number of bytes per slice 5 after coding is the same for all the slices 5. In this case, the cutting up into image portions is such that each image portion or slice may contain a variable number of macroblocks.

Figure 5:
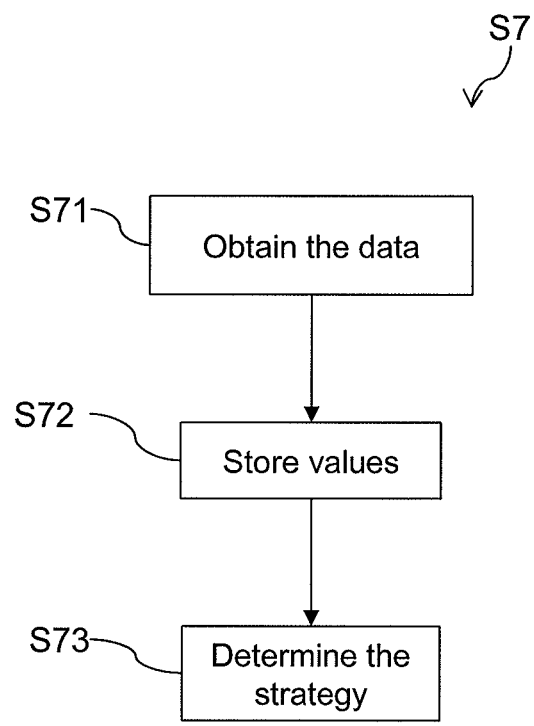
FIG. 5 is a flowchart representing a detailed embodiment of step S7 of FIG. 4.

Step S7 of determining the cutting up strategy may comprise a succession of sub-steps illustrated in FIG. 5 in the form of an algorithm.

A first sub-step S71 for obtaining data consists in receiving a message from the server 1 containing an identifier of the cutting up strategy.

Next, the received identifier is stored in memory at a second storage sub-step S72. Lastly, at a third sub-step S73 the cutting up strategy used by the server is determined on the basis of the received identifier.

In this embodiment, the part of the method implemented in the client device and which is adapted to determine the cutting up strategy is not complex. However, it is necessary for the server to be capable of providing the client with an identifier of the cutting up strategy.

According to a variant embodiment, the data obtaining sub-step S71 consists of retrieving all the slices of a current image received at the receiving and depacketizing step S5 of FIG. 4. The data of the slices of the current image that are received are stored in memory at a storage sub-step S72. These two steps are implemented for each image 7 of a video sequence 4 (FIGS. 2 and 3).

In this variant embodiment, the S73 sub-step for determining the cutting up strategy comprises a first sub-step consisting in determining the number of macroblocks 6 (sub-portions) and the number of bytes contained in a slice 5 (image portion).

The sub-step S73 for determining the cutting up strategy further comprises a second sub-step of comparison consisting in comparing the number of macroblocks per slice of the current image with the number of macroblocks per slice of the preceding image. Thus, when the number of macroblocks per slice is identical for both images, it is considered that the cutting up strategy resides in the use of a fixed number of macroblocks per slice.

Similarly, when the number of bytes per slice is similar between the images, it is considered that the cutting up strategy resides in the use of a fixed number of bytes per slice. As a matter of fact, the number of bytes per slice has a similar value from one image to the other according to a predetermined tolerance margin.

In this variant, the sub-step S73 for determining the cutting up strategy is implemented for each image 7 of the video sequence 4.

However, alternatively, the sub-step for determining the cutting up strategy S73 is implemented for a limited number of images. Thus, the number of calculations carried out by the client 2 is reduced. As a matter of fact, in general, the cutting up strategy employed on coding a video sequence 4 is unique. This thus makes it possible to reduce the complexity of the calculations on implementation of this determining sub-step S73.

This limited number of images may correspond, for example, to a first group of images termed GOP (meaning "group of pictures") or to the three first images of the video sequence 4.

Furthermore, still according to this variant the value of certain parameters is stored in memory at the storage sub-step S72. For example, when the cutting up strategy resides in the use of a fixed number of macroblocks per slice, the number of slices per image 7, denoted nb_slice, and the area of each slice, denoted Si, are stored in memory. In this case, the area of each slice is equal to the number of macroblocks per slice multiplied by the number of pixels per macroblock (area of a macroblock in pixels).

It will be noted here that the image areas are areas expressed in pixels.

These values are determined on decoding a correctly received image 7 The calculation of these values is known to the person skilled in the art and will not be described here.

When the cutting up strategy resides in the use of a fixed number of bytes per slice, the number of bytes per slice, denoted nb_bytes, is stored.

Furthermore, the number of slices per image 7, nb_slice, is stored in memory.

As promised above, a description will now be made in more detail, with reference to FIG. 6a, of the step S8 of determining an item of information representing the reconstruction quality of lost data by an error correction algorithm.

Figure 6A:
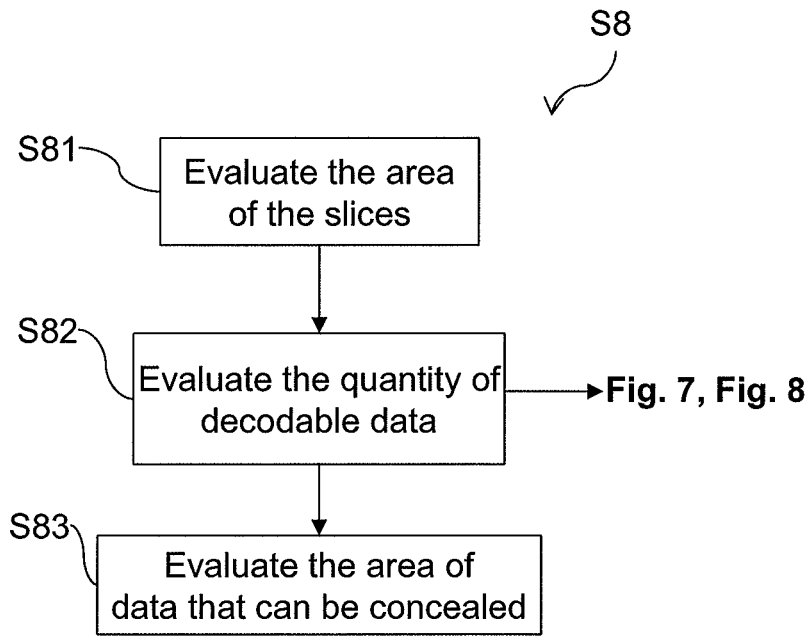
FIGS. 6a and 6b are two flowcharts representing two detailed embodiments of step S8 of FIG. 4.

In the embodiment represented in FIG. 6a the correction algorithm is an error concealment algorithm.

In this example, the item of representing the reconstruction quality corresponds to the image area to conceal, that is to say to reconstruct. The image area to conceal may be expressed in number of pixels.

The step S8 for determining this item of information comprises the following sub-steps, implemented for each slice 5 of an image.

a sub-step S81 of evaluating the area Si of an image slice, this area Si being expressed in pixels, a sub-step S82 of evaluating the quantity of decodable data in the image slice, that is to say the number of items of data contained in the image slice and which may be decoded, and a sub-step S83 of evaluating the area SMi to reconstruct of that slice, that area SMi to reconstruct being expressed in pixels.

The area SMi to reconstruct is evaluated using the equation $SMi=Si(1-QDec,i)$ in which SMi represents the size of the area to reconstruct for the image slice i, Si represents the size of the area of the slice i and QDec,i represents the quantity of decodable data in the slice i.

Figure 7:
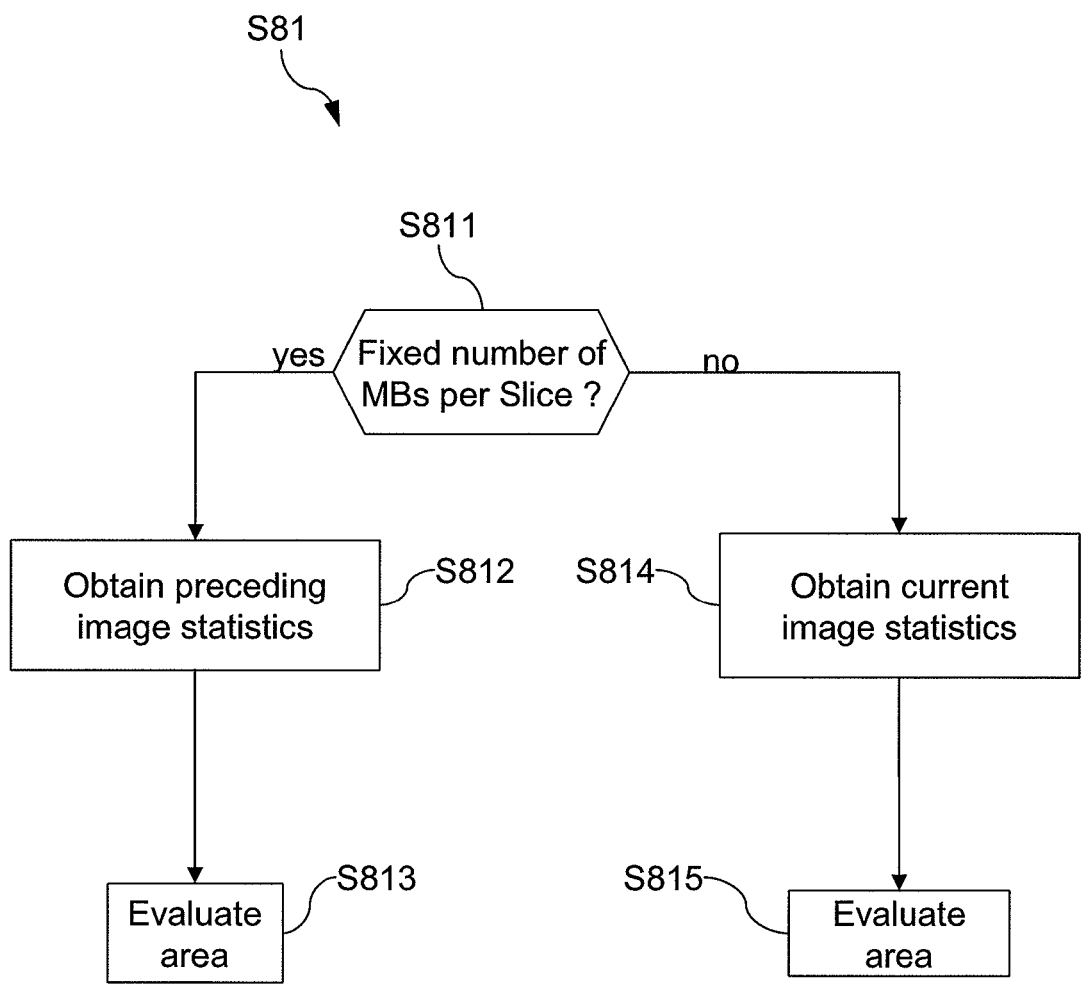

The sub-step S81 of evaluating the value of the area Si of the slice 5 is detailed in FIG. 7.

At a first verifying step S811, the client 2 carries out a test in order to verify the item of information representing the cutting up strategy which is determined beforehand.

When the cutting up strategy corresponds to the use of a fixed number of macroblocks per slice 5, step S811 is followed by an obtaining step S812. During this step the client 2 obtains a set of parameters concerning the preceding image. In particular, the client 2 obtains the area Si in pixels of each slice i of the preceding image. As described above, these parameters were stored in memory beforehand (sub-step S72).

Next, a sub-step S813 of evaluating the area Si of each slice 5 is performed. In the preferred embodiment, these areas are identical for all the images of the video sequence for that cutting up strategy and were calculated and stored at step S72.

When the cutting up strategy corresponds to the use of a fixed number of bytes per slice, it is considered that the pixels of an image are shared fairly between each image slice.

Thus, at a following obtaining step S814, the client 2 obtains a set of parameters concerning the current image.

In particular, the client 2 obtains the number of slices per image nb_slice, calculated at the sub-step S72.

Next, at an evaluating step S815, the size of the area Si of each image slice is evaluated using the equation $$Si = \frac{SI_m}{NS_m}$$

in which $SI_m$ is the size of the area in pixels of the current image m and $NS_m$ is the number of slices of the current image.

Thus, the area Si in pixels of each slice 5 is evaluated according to the cutting up strategy employed by the server 1.

An alternative method consists of taking into account the complexity of the data of each slice 5 so as to refine the evaluation of their area Si. A complexity factor Ci is determined for each slice 5 of an image preceding the current image.

When the number of slices in the current image and in the preceding image are identical, the area Si of the slices of the current image is evaluated as being equal to the area of the corresponding slice in the preceding image.

When the number of slices in the preceding image is less than that of the current image, the coding cost (in bits) of the pixels is increased between the two images. The area Si of the slices 5 has thus reduced for the most complex slices 5 of the image (having the highest complexity factor Ci). To reflect this phenomenon, the slices 5 of the preceding image having the greatest complexities Ci are determined. The number of slices 5 considered corresponds for example to the difference (in absolute value) between the number of slices 5 of the current image and of the preceding image divided by two. Each of these slices is divided into two slices of equal area so as to obtain the same number of slices in the current image and in the preceding image so modified.

When the number of slices 5 in the preceding image is greater than that of the current image, the slices 5 having the greatest complexity values are divided into two equal areas. The first area is associated with a first slice and the second area with a second slice following the first slice. If one of the preceding or following slices is not available, the whole of the determined slice is associated with the available slice.

The areas Si of the slices are then evaluated as being equal to the areas so determined in the preceding image.

A description will now be given of the sub-step S82 of evaluating the quantity of decodable data in the image slice, denoted QDec,i, with reference to FIG. 8.

The quantity of decodable data depends on the strategy for dividing the slices 5 into network packets.

Thus, for example, when the data corresponding to a slice 5 are contained in the same network packet, the loss of such a network packet does not prevent the decoding of the other network packets of the same image 7. Consequently, for a network packet received by the client 2, the parameter representing the quantity of decodable data in the image slice QDec,i is equal to the unit.

Thus, the image area SMi to reconstruct for the slice i is zero.

When the data corresponding to a slice are divided into fragmented units and distributed into several network packets, initialization step S821 (FIG. 8) is proceeded to.

The steps described below are performed for each slice of the current image.

At this initialization step variables are established at a predefined value.

A first variable nb_FU_ok_i keeps an account of the number of consecutive fragmented units or fractions of slices correctly received by the client for the current slice i which corresponds to the slice in course of being processed. The value predefined for this variable is for example zero.

A second variable nb_FU_total_i corresponds to the number of fragmented units for the current slice i. The predefined value of this variable depends on the cutting up strategy and its determination will be described below with reference to FIG. 9.

Once the predefined values of the variables nb_FU_ok_i, nb_FU_total_i has been established, a verification step S822 is performed. This verification step S822 consists of verifying the presence in a first fragmented unit or first packet, of the start of slice indicator.

If the start of slice indicator is not present, step S822 is followed by step S829 of determining the quantity of decodable data QDec,i. If the start of slice indicator is present, the first variable nb_FU_ok_i is incremented by one unit at an updating step S823.

At a selecting step S824, the following fragmented unit or network packet is selected, and (step S825) it is verified whether a fragmented unit is missing. For this, as described above, comparison is made between the sequence numbers of the preceding network packet and the selected or current network packet.

When a network packet or fragmented unit is missing, step S825 is followed by step S829 of determining the quantity of decodable data QDec,i. If no network packet or fragmented unit is missing between the preceding network packet and the current network packet, the first variable nb_FU_ok_i is incremented by one unit at a second updating step S826.

Lastly, it is verified whether the current network packet is the last network packet of the current slice 5 at a verifying step S827. When it is the last network packet, execution of the step S829 described earlier is proceeded with. If the network packet is not the last packet of the current slice, the selecting step S824 described earlier is proceeded to in order to select the following network packet or fragmented unit.

Consequently, when at least one network packet or fragmented unit is missing or when all the network packets or fragmented units have been processed, step S829 of determining the quantity of decodable data QDec,i is performed.

The quantity of decodable QDec,i is determined according to the following equation:

$$QDec, i = \frac{nb\_FU\_ok\_i}{nb\_FU\_total\_i}$$

Once the quantity of decodable data QDec,i in a slice 5 has been determined and the area Si in pixels of each image slice has been evaluated, the area to reconstruct SMi is evaluated using the equation SMi=Si(1−QDec,i).

Consequently, the item of information is obtained representing the reconstruction quality of data by an error concealment algorithm. This item of information depends on the cutting up strategy (here cutting up using a fixed number of macroblocks or a fixed number of bytes per slice), as well as on the strategy for dividing the slice 5 into network packets or fragmented units.

Figure 9:
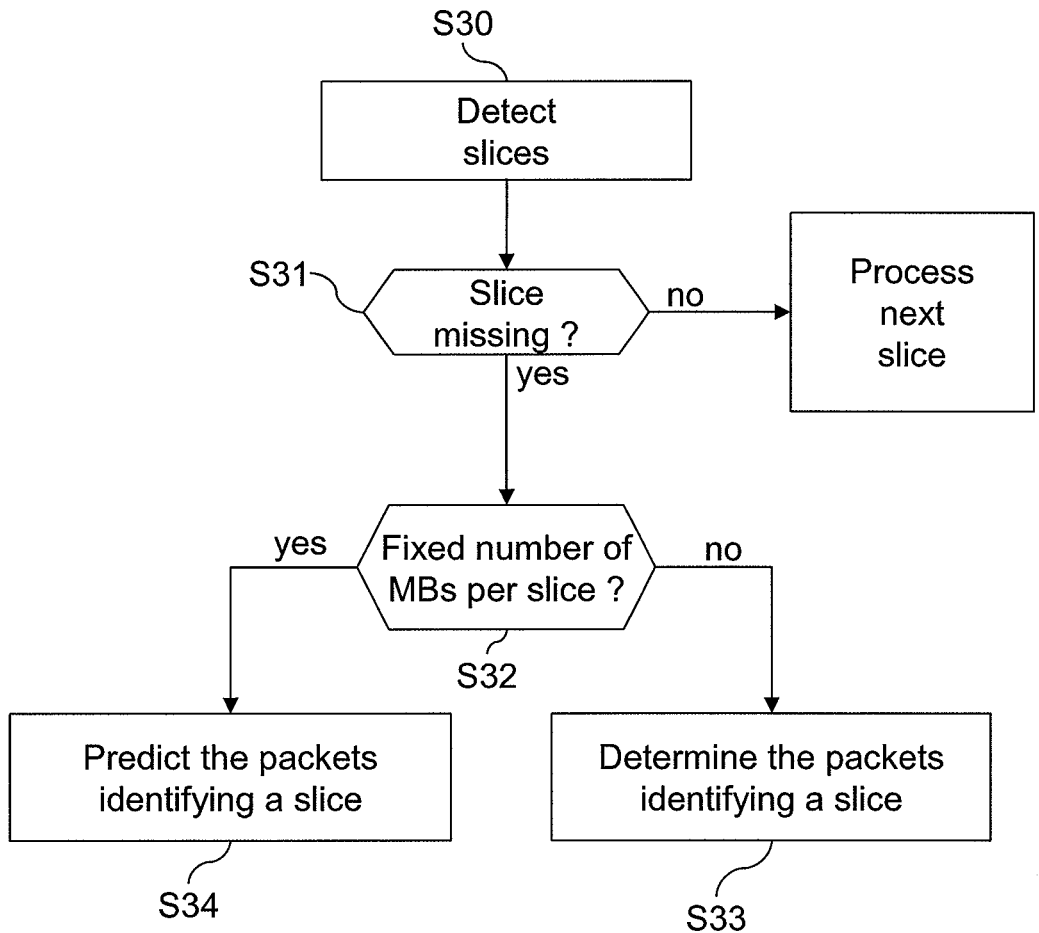
FIG. 9 is a flow diagram representing an embodiment of a part of the method in accordance with the invention.

With reference to FIG. 9, a description will now be made of the association between each slice and each network packet on division of the slice 5 into network packets, and of the determination of the second variable nb_FU_total_i corresponding to the number of fragmented units in a slice.

FIG. 9 comprises a succession of steps illustrated in the form of an algorithm.

At a first step S30 of detecting slices, the depacketizing step S5 described above (FIG. 4) is performed. At this step the received network packets are analyzed, as well as their sequence number, in order to detect the missing network packets. As output from the detecting step a set of network packets is obtained corresponding to a slice 5, these network packets being associated with an index representing the slice 5. It is thus considered that the slices 5 of an image 7 have been detected.

At a comparing step S31, the number of slices detected at a slice detecting step S30 is compared with a number of slices provided. This comparison makes it possible to identify whether a slice was not detected at the depacketizing step S5. This occurs in particular when several consecutive network packets are lost.

For example, if it is considered that each packet P1-P9 of FIG. 3 contains a fragmented unit, that the first four packets P1 to P4 correspond to a first slice, that the following four packets P5 to P8 correspond to a second slice, and that the packets P4 (containing an end indicator of the first slice) and P5 (containing a start indicator of the second slice) have been lost, all the network packets P1 to P3 and P5 to P8 would be erroneously considered as being associated with the same slice.

In order to avoid this, the steps described below enable the position of the start and end of slice indicators to be estimated. Thus, the number of slices detected is not erroneous.

The number of slices provided for an image is determined according to the cutting up strategy determined at the sub-step S73 (FIG. 5).

When the cutting up strategy used is cutting up using a fixed number of macroblocks 6 per slice 5, the number of slices 5 provided for the current image is equal to the number of slices 5 of the preceding correctly received image.

When the cutting up strategy used is cutting up using a fixed number of bytes, the number of slices 5 provided for the image is determined by dividing the number of bytes used to code the image by the number of bytes per slice, designated nb_byte, and which had been stored in memory at sub-step S72.

Returning to step S31, when the number of detected slices does not match the number of slices provided, the steps S32, S33 and S34 make it possible to estimate the packets identifying the non-detected slices.

On the contrary, if the test performed at step S31 turns out to be negative (no missing slice), provision is made to process the following slice.

When the test is positive, step S31 is followed by step S32 during which it is verified whether the number of macroblocks is fixed per slice.

When the verifying step S32 reveals that the cutting up strategy used is cutting up using a fixed number of bytes per slice, during the following step S33 the position of the packets identifying the start of a slice is determined.

Determination is made of the number of packets necessary to transmit a slice 5 over the network 3 by taking the ratio Rps of the number of bytes per slice, denoted nb_bytes, which was stored in memory at the sub-step 5 over the number of useful bytes per packet.

In this example, it is considered that the number of packets necessary to send a slice is the integer part higher than that ratio Rps. On the basis of the number of packets used to code the current image (information known by the depacketizer), the number of slices provided for the current image is obtained by taking the ratio of the number of packets used to code the current image over the number of packets necessary to send a slice 5.

At step S33 a packet is determined identifying the start of a slice 5 by the equation $SN_p=SN_1+k*NP$ in order to obtain the sequence number $SN_p$ of the packet p identifying the slice k. In this equation, NP is the number of packets used to send a slice and $SN_1$ is the number sequence of the first packet of the image.

When the verifying step S32 reveals that the cutting up strategy used is cutting up using a fixed number of macroblocks, during the step S34 the position of the packets identifying the start of a slice is predicted.

At this step, the groups of consecutively lost packets are analyzed. Whan at least two consecutive packets are missing, it is assumed that a fragmented unit identifying the start of a slice may be included in one of those lost packets.

For example, the last of the at least two missing packets is marked as containing a fragmented unit identifying the start of a slice.

As two consecutively lost packets do not necessarily contain any slice start or end marker, the number of slices detected may be greater than the real number of the slices per image.

In order to obtain an estimation of the number of slices detected that is closer to reality, determination is made of the average number of packets used to send the slices not having undergone consecutive packet losses.

For this, the packet is determined that identifies the first packet of a slice (i.e. containing a start of slice marker or else such that the preceding packet contains an end of slice marker) as well as the packet identifying the last fragmented unit of the slice (i.e. the packet containing an end of slice marker or else such that the following packet contains a start of slice marker). If, between these two packets, there have been no consecutive losses of packets, the quantity of packets used to send the slice is equal to the difference between the sequence numbers of the two packets to which one unit is added. This process is reiterated for each slice in order to calculate the average number of packets used to send the slices.

According to a variant, the number of packets used to code each slice of the preceding image is identified.

Next, the number of packets used to code the correctly received slices of the current image is divided by the number of packets of the same slices of the preceding image. A factor is thus obtained indicating the variation in the number of network packets used to code the slices between the current image and the preceding image.

On account of this, for a slice of the current image containing missing packets, the number of packets of the corresponding slice in the preceding image is multiplied by the factor so obtained.

Consequently, the number of packets used to code a slice containing missing packets is obtained.

Figure 10:
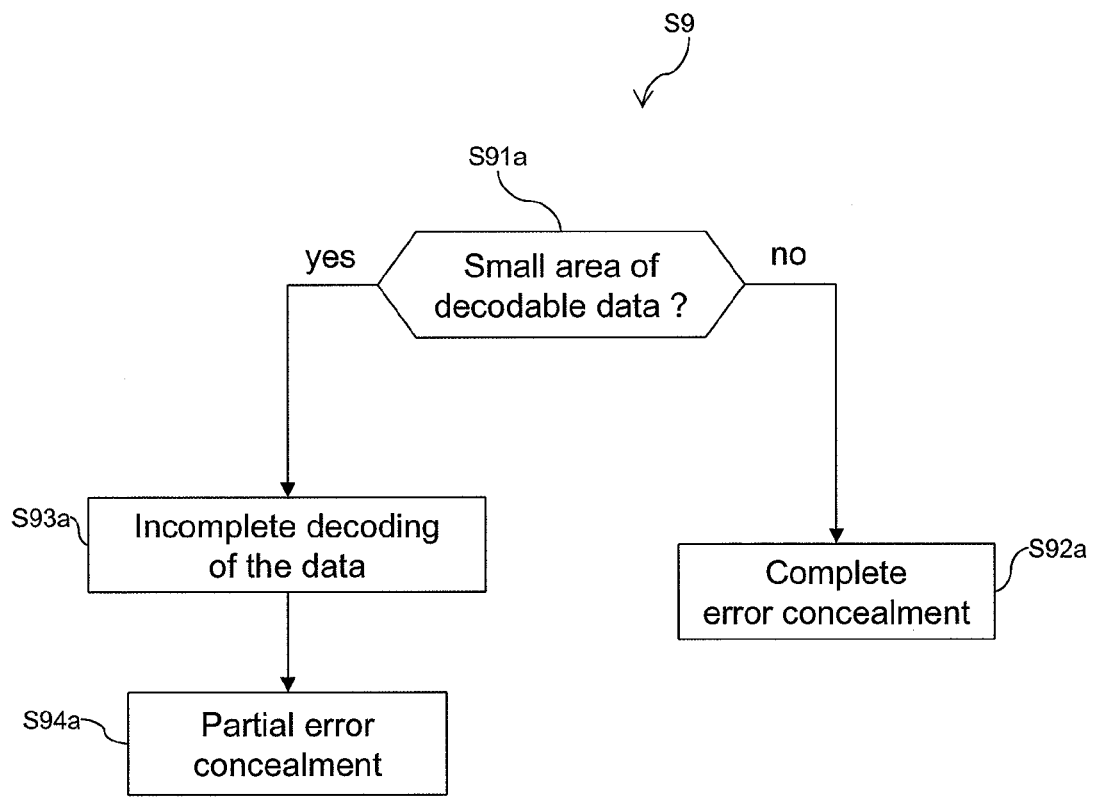
FIG. 10 is a flowchart representing a first detailed embodiment of step S9 of FIG. 4.

FIG. 10 illustrating in more detail the step S9 of adapting the error concealment algorithm (FIG. 4) will now be described.

In this embodiment, the adapting step S9 comprises a step S91a of comparing the image area SMi to reconstruct of the slice i with a threshold T representing a quality limit. This threshold T represents a image area (or image size) limit beyond which the quality of the error correction algorithm diminishes.

In this example, when the image area SMi to reconstruct is less than the threshold T, that is to say that the image area SMi to reconstruct is small (area of decodable data high), the quality of the error correction algorithm is acceptable. An error concealing step S92a is proceeded to during which the error concealment algorithm is applied to the whole slice 5.

On the contrary, when the image area SMi to reconstruct is greater than the threshold T, that is to say that the image area SMi to reconstruct is large, the quality of the error correction algorithm is not acceptable. A step S93a is then proceeded to in which the useful data contained in the packets preceding the first lost network packet of the slice are decoded.

Next, the error concealment algorithm is applied to the remaining useful data at a step S94a of partial error concealing for the useful data. Thus, the error concealment algorithm is applied to a part of the slice 5 which corresponds to the part of the data not received.

Consequently, the error concealment algorithm is adapted according to the area of the slice SMi to reconstruct, that is to say according to the item of information representing the reconstruction quality and which has been determined.

Thus, the reconstruction quality for the concealment algorithm is optimized.

By way of example that is in no way limiting, the value of the threshold T represents 10% of the area of a high definition sequence, i.e. 207360 pixels for a sequence with 1920×1080 pixels.

A description will now be given with reference to FIG. 6b of the step S8 of determining an item of information representing the reconstruction quality for lost data by an error correcting method different from that illustrated in FIG. 6a.

Figure 6B:
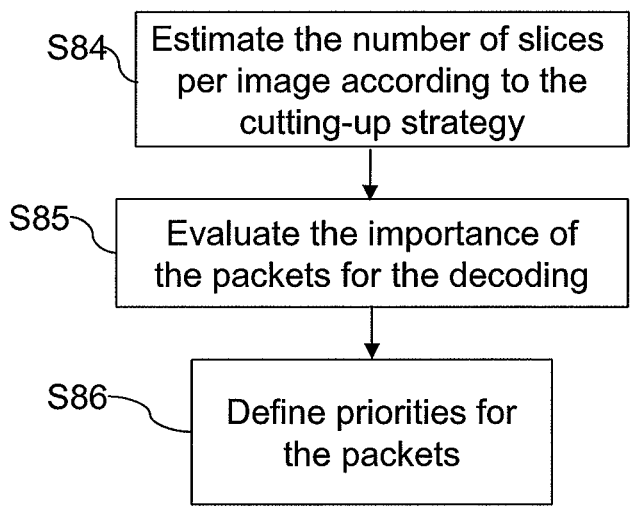

The method illustrated in FIG. 6b provides for correcting errors by requesting retransmission of lost or error-tainted data.

In this example, the item of information representing the reconstruction quality depends on the importance of each network packet for the decoding.

It will be noted that the quantity of decodable data of a slice depends on the position of the lost fragmented unit in the slice. Thus, the quantity of decodable data of a slice is different when a lost network packet contains the first or the last fragmented unit of the slice.

As a matter of fact, the quantity of decodable data will be less in the first case, that is to say when the lost network packet contains the first fragmented unit of the slice.

Thus, the importance of each packet for the decoding varies according to the data contained in the packet.

At an estimating step S84, the number of slices 5 provided by the image 7 is estimated according to the cutting up strategy applied at the server.

Next, at a determining step S85, the quantity of data able to be reconstructed if the lost packet was re-sent to the client 2 is determined for each lost network packet. This makes it possible to associate a level of importance with each lost network packet.

Lastly, on the basis of the importance levels so determined for each lost packet, a level of priority for processing (for the re-send request) is associated at step S86 with each lost network packet.

Figure 11:
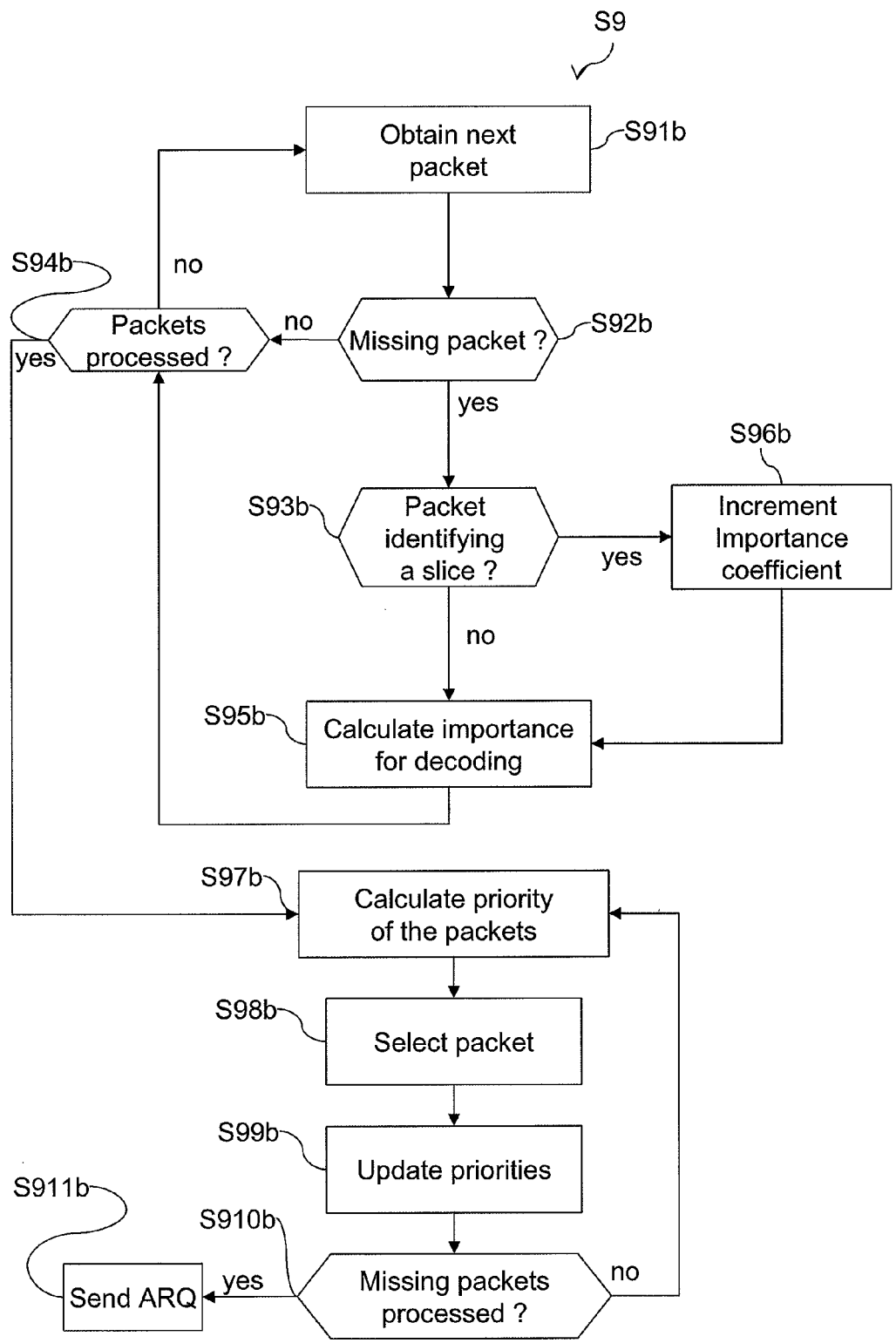
FIG. 11 is a flowchart representing a second detailed embodiment of step S9 of FIG. 4.

These steps will be described in more detail with reference to FIG. 11 which illustrates a second embodiment of the adapting step S9 of the error correction algorithm.

This embodiment has an algorithm in which error correction is by request for re-sending the lost packets.

The steps described below are implemented for each packet corresponding to the same image 7.

At a first selecting step S91b, a first selected packet is obtained and its sequence number is analyzed. When the selected packet does not reveal any missing packet (S92b), a verification step S94b is proceeded to consisting of verifying whether all the packets of an image have been processed. If there are packets which have not been processed, the selecting step S91b is returned to in order to select the following packet.

When the packet selected at step S91b shows that there is a missing packet (S92b), it is determined whether that lost packet makes it possible to identify a new slice at a verifying step S93b.

It will be noted that the packets making it possible to identify a new slice are determined at the steps S34 or S33 (FIG. 9) according to the cutting up strategy.

If it is determined that the lost packet enables a new slice to be identified, a coefficient or criterion of importance In is associated with it (n being for example the sequence number) having a value greater than one (step S96b). If it is determined that the lost packet does not enable a new slice to be identified, an importance criterion In is added to it of which the value is equal to one (S93b).

Next, the importance of the lost packet for the decoding is determined at a calculating step S95b.

In a simple implementation, the importance criterion calculated previously is sufficient to determine the importance of the packet for the decoding.

In an optimized implementation, step S95b enables the measure of importance of the packet for the decoding of the image portion to be refined.

As described above, it will be noted that a first missing packet is more important than a second missing packet if it is considered that in case of re-sending the first packet correctly received enables more data to be decoded than the second correctly received packet.

Thus, at calculating step S95b it is temporarily considered that the lost packet has been correctly received.

Figure 8:
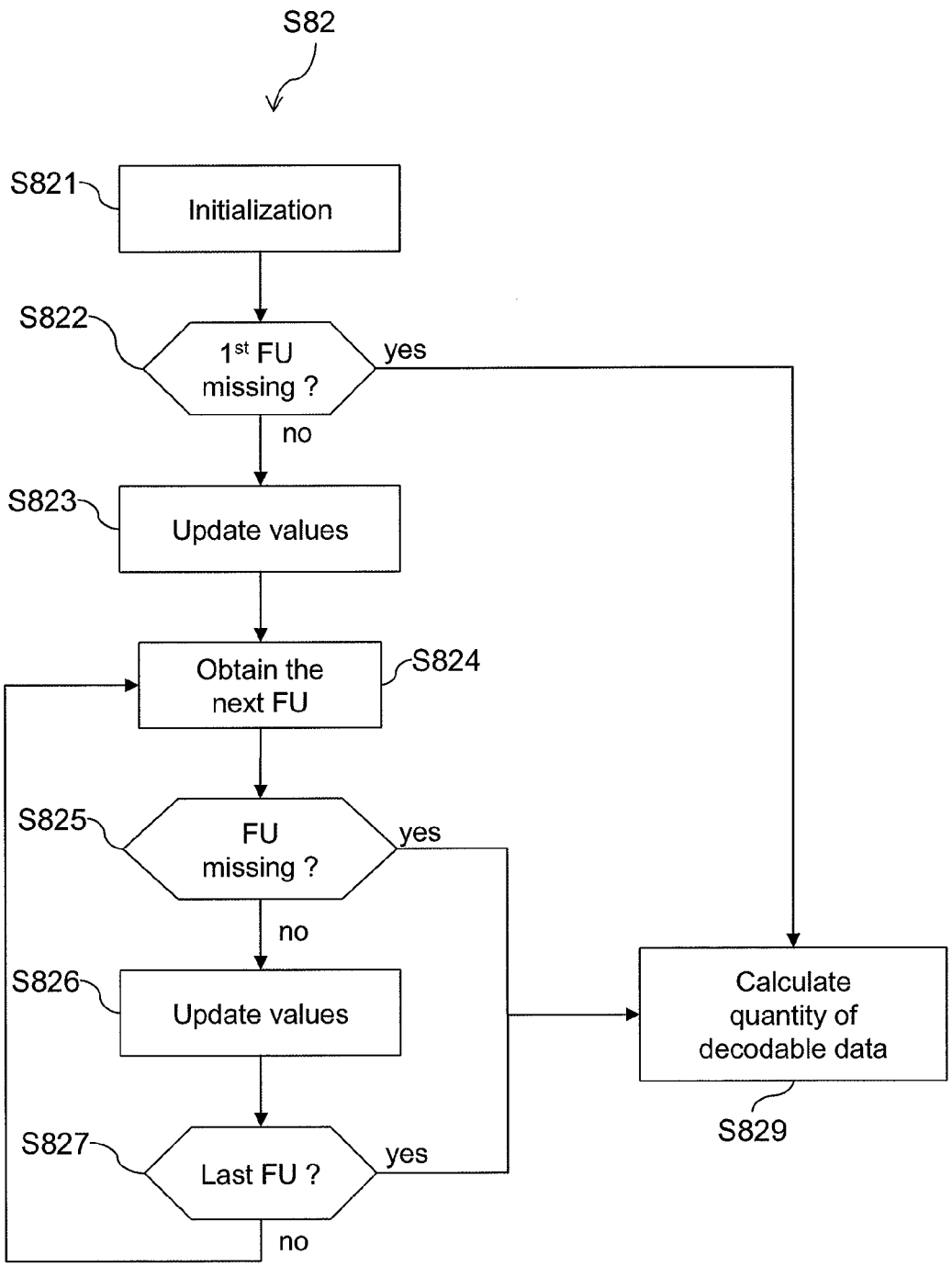

Next, the quantity of data decodable in slice 5 denoted Q'Dec,i is determined, as already described at step S829 of FIG. 8.

Consequently, the quantity of data decodable in the image slice Q'Dec,i represents the quantity of data of the slice 5 which could be decoded if the lost packet had been correctly received by the client 2.

Step S95b is followed by step S94b described earlier.

Once it has been verified at step S94b that all the packets have been processed, that is to say that the importance for the decoding has been determined for all the lost network packets of a slice 5, the following step S97b is proceeded to.

This step S97b consists of determining the priority of each lost packet. The priority $P_n$ for a packet n is determined according to the following equation:

$$P_n = I_n(Q'\text{Dec},i - Q\text{Dec},i),$$

in which n represents the lost packet, i represents the slice 5, $I_n$ is the coefficient of importance determined at step S93b or S96b, Q'Dec,i is the quantity of data decodable when considering the packet n as received and QDec,i is the quantity of data decodable when considering the packet n as not received.

Once the priorities $P_n$ of the lost packets have been calculated, selection is made at step S98b of the packet having the highest priority $P_n$ and it is considered as having been correctly received.

Next, at a step S99b the updating of the priorities is carried out. It is considered that the value of the quantity of decodable data QDec,i is equal to the value of the quantity of decodable data Q'Dec,i when treating the packet n as received. The priorities $P_n$ are thus recalculated for the remaining lost packets of the same image.

Once it has been verified that all the lost packets of an image have been processed at step S910b the re-sending of the lost packets is requested according to the priorities $P_n$ determined via the sending to the server of a re-send request of ARQ ("Automatic Repeat reQuest") type.

In this example, the first packet requested is that with the highest priority $P_n$, that is to say the one selected first at the selecting step S98b.

Consequently, if the server cannot favorably reply to all the re-send requests, the lost packets enabling a higher quantity of data to be decoded will receive priority for re-sending.

If all the lost packets have not been processed, step S910b is followed by step S97b described earlier.

Figure 12:
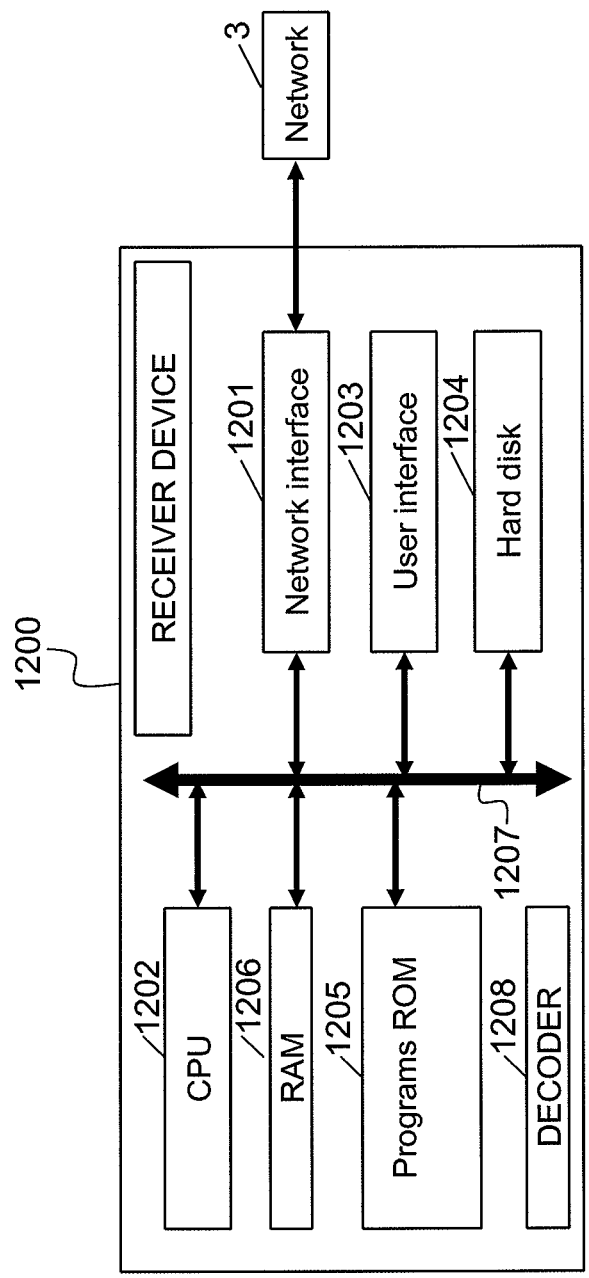
FIG. 12 is a diagram of a particular embodiment of an apparatus capable of implementing the present invention.

FIG. 12 illustrates a device implementing a method of correcting errors in accordance with the invention, in a particular embodiment.

The communication device or apparatus 1200 (able to communicate across a network) comprises a network communication interface 1201 which enables the connection of the device 1200 to the communication network 3. The software application, when executed by the central processing unit 1202, is adapted to process requests through the network communication interface 1201 and to provide data streams via the network (server 1). Inversely, the device 1200 is adapted to send requests via the network 3 and to receive, in reply, a data stream to process (client 2). The network communication interface 1201 is able to receive digital data to process by the device in the context of the implementation of the invention.

The device further comprises an optional user interface 1203 to display information to a user, and/or to receive inputs therefrom.

The device 1200 also comprises a storage means 1204 such as a hard disk. It may also comprise a disk drive.

This disk may for example be a diskette, a CD-ROM, or a DVD-ROM, a memory card or a USB peripheral, for example. The disk can contain data processed according to the invention as well as the program or programs implementing the invention which, once read by the device 1200, will be stored on the hard disk 1204. As a first variant, the program or programs enabling the device to implement the invention can be stored in read only memory 1205 (called ROM or "Read Only Memory"). In a second variant, the program or programs may be received in order to be stored in an identical fashion to that described previously via the communication network.

This same device may have a screen for displaying the data processed or serving as an interface with the user, who can thus select other data to process, using the keyboard or any other means (a mouse, wheel or stylus, for example).

The central processing unit 1202 (referred to as CPU in the drawing) is able to execute the instructions relating to the implementation of the invention, which are stored in the read only memory 1205 or in the other storage means. For example, the central processing unit executes the steps illustrated in described FIGS. 4 to 11. On powering up, the processing programs stored in a non-volatile memory, for example the ROM 1205, are transferred into the random access memory RAM ("Random Access Memory") 1206, which will then contain the executable code of the invention, as well as registers for storing the variables necessary for implementing the invention.

The memory capacity may be increased by an optional RAM connected to an extension port (not illustrated). The instructions concerning the software application may furthermore be loaded into the random access memory RAM 1206 from the hard disk 1204.

More generally, an information storage means, which can be read by a computer or microprocessor, integrated or not into the device, and which may possibly be totally or patially removable, is adapted to store one or more programs whose execution permits the implementation of the error correcting method according to the invention. Such a software application, when executed by the central processing unit 1202, gives rise to the execution of the steps of the flowcharts/algorithms shown in FIGS. 4 to 11.

The means constituting an error correcting device adapted to implement the error correcting method in accordance with the invention described above comprise the central processing unit 1202, the ROM 1205, the RAM 1206 and the hard disk 1204.

In particular, the central processing unit 1202, the ROM 1205, the RAM 1206 and the hard disk 1204 notably comprise means for determining the cutting up strategy, means for determining an item of information representing the quality of reconstruction of lost data by an error correcting method, and means for adapting the error correcting method.

A device comprising these means is adapted to implement the described error correcting method.

A communication bus 1207 affords communication between the different elements included in the device 1200 or connected to it. The representation of the bus 1207 is non-limiting and in particular the central processing unit 1202 unit may communicate instructions to any element of the device 1200 directly or by means of another element of the device 1200.

The device 1200 further comprises a decoder 1208, for example in the form of a standard chip, used by the central processing unit 1201 in a conventional manner via the bus 1207.

This device 1200 is for example a micro-computer or a workstation or a digital assistant or a mobile telephone or a digital camcorder or a digital camera or a video surveillance camera (Webcam) or a DVD reader or a multimedia server or a router element in a network. This apparatus may directly incorporate a digital image sensor, or be connected to different peripherals such as a digital video camera (or a scanner or any means for image acquisition or storage) connected to a graphics card and supplying the apparatus with multimedia data. The apparatus may also have access to multimedia data on a storage medium (for example the hard disk 1206) or may receive from a network a multimedia stream to modify.

Thus, thanks to the invention, the error correcting method is optimized according to the strategy used for cutting up the images into image portions used on coding the data stream.

Naturally, many modifications can be made to the embodiment described above without departing from the scope of the invention.

For example, other error correcting methods may be used in the method according to the invention.

What we claimed is:

1. A method of correcting errors in a data stream of at least one image, implemented in a data reception device, said at least one image being cut up into image portions, said stream being coded by image portion, and divided into data packets, the method comprising:
   a step of detecting at least one lost data packet;
   determining a strategy for cutting up said at least one image into image portions;

determining data that is decodable in an image portion containing the at least one lost data packet;

determining, according to the determined cutting-up strategy and a quantity of decodable coded data received by said reception device, an item of information representing a reconstruction quality of data included in said at least one lost data packet by an error correcting method;

adapting said error correcting method according to the determined item of information representing the reconstruction quality; and applying the error correcting method adapted in the adapting step to reconstruct the data included in said at least one lost data packet.

2. A method according to claim 1, wherein the step of determining the strategy for cutting up each said at least one image into image portions comprises a sub-step of determining a number of image sub-portions in an image portion and a number of bytes contained in said image portion.

3. A method according to claim 1, wherein the cutting up strategy uses a fixed number of sub-portions per image portion.

4. A method according to claim 1, wherein the cutting up strategy uses a fixed number of bytes per image portion.

5. A method according to claim 1, wherein the step of determining an item of information representing the reconstruction quality of lost data comprises the following sub-steps, which are implemented for each image portion belonging to an image:

evaluating the area of said image portion;

evaluating the quantity of decodable data in said image portion; and evaluating the area to reconstruct of said image portion according to said evaluated area of said image portion and said evaluated quantity of decodable data.

6. A method according to claim 1, wherein the step of adapting the error correcting method comprises a prior step of comparing the determined item of information representing the reconstruction quality with a threshold representing a quality limit.

7. A method according to claim 6, wherein the threshold representing a quality limit represents an image area limit.

8. A method according to claim 7, wherein when the item of information representing the quality is less than the threshold, said item of information representing the quality depending on the area to reconstruct by the error correcting method, the error correcting method is applied to the whole image portion.

9. A method according to claim 7, wherein when the item of information representing the quality is greater than the threshold, said item of information representing the quality depending on the area to reconstruct by the error correcting method, the error correcting method is applied to a part of the image portion.

10. A method according to claim 1, wherein the item of information representing the reconstruction quality of lost data depends on an importance criterion of each lost data packet.

11. A method according to claim 10, wherein the importance criterion of a data packet depends on the quantity of decodable data of said image portion when data corresponding to a lost packet is correctly recovered after retransmission.

12. A method according to one of claim 10 or 11, wherein a processing priority level is associated with each lost data packet, respectively according to the importance of said lost data packets.

13. A method according to claim 12, wherein the error correcting method comprises a request for re-sending the lost data packets according to the priority levels associated with the lost data packets.

14. A device for correcting errors in a data stream of at least one image, said at least one image being cut up into image portions, said stream being coded by image portion and divided into data packets, said device comprising:

receiving means for receiving data;

detecting means for detecting at least one lost data packet;

first determining means for determining a strategy for cutting up said at least one image into image portions;

second determining means for determining data that is decodable in an image portion containing the at least one lost data packet;

third determining means for determining, according to the determined cutting-up strategy and the quantity of decodable code data received by said receiving means, an item of information representing a reconstruction quality of data included in said at least one lost data packet by an error correcting method;

adapting means for adapting said error correcting method according to the determined item of information representing the reconstruction quality; and applying means for applying said error correcting method adapted by the adapting means to reconstruct the data included in said at least one lost data packet.

15. A device according to claim 14, wherein the first determining means for determining the cutting-up strategy comprises means adapted to determine a number of sub-portions and a number of bytes contained in said image portion.

16. A device according to one of claim 14 or 15, wherein the third determining means for determining an item of information representing the reconstruction quality of lost data comprises:

first evaluating means for evaluating the area of said image portion;

second evaluating means for evaluating the quantity of decodable data in said image portion; and third evaluating means for evaluating the area to reconstruct of said image portion according to said evaluated area of said image portion and said evaluated quantity of decodable data.

17. A non-transitory computer readable storage medium on which is stored computer executable code which can be read by a computer or a microprocessor and implements the method according to claim 1, when said code is read by said computer or said microprocessor.

* * * * *